United States Patent
Wang (10) Patent No.: US 11,200,566 B2
(45) Date of Patent: Dec. 14, 2021

(54) ENHANCING PERFORMANCE OF INTER-SYSTEM SERVICE OPERATIONS

(71) Applicant: Advanced New Technologies Co., Ltd., Grand Cayman (KY)

(72) Inventor: Huan Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 193 days.

(21) Appl. No.: 16/009,310

(22) Filed: Jun. 15, 2018

(65) Prior Publication Data

US 2018/0300715 A1 Oct. 18, 2018

Related U.S. Application Data

(63) Continuation of application No. PCT/CN2016/108773, filed on Dec. 7, 2016.

(30) Foreign Application Priority Data

Dec. 17, 2015 (CN) .............................. 201510947116

(51) Int. Cl.
*G06Q 20/38* (2012.01)
*G06Q 20/12* (2012.01)
(Continued)

(52) U.S. Cl.
CPC ........... *G06Q 20/381* (2013.01); *G06Q 20/02* (2013.01); *G06Q 20/10* (2013.01); *G06Q 20/102* (2013.01);
(Continued)

(58) Field of Classification Search
CPC ...... G06Q 20/381; G06Q 20/02; G06Q 20/10; G06Q 20/102; G06Q 20/227; G06Q 20/4014; H04L 63/0815; H04L 63/083
See application file for complete search history.

(56) References Cited

U.S. PATENT DOCUMENTS 7,742,985 B1 6/2010 Digrigoli et al.
9,172,693 B2 * 10/2015 Griffin ................... G06F 21/41
(Continued)

FOREIGN PATENT DOCUMENTS

CN 101154282 4/2008
CN 104166912 11/2014
(Continued)

OTHER PUBLICATIONS

Visa selects BCE emergis for global work on next-generation B2B payment service; visa commerce promises global B2B payment and information management platform. (Jul. 15, 2002). Business Wire Retrieved from https://dialog.proquest.com/professional/docview/1055350297?accountid=131444 on Aug. 6, 2021 (Year: 2002).*

(Continued)

*Primary Examiner* — Kito R Robinson
(74) *Attorney, Agent, or Firm* — Fish & Richardson P.C.

(57) ABSTRACT

A first service request is received from a source system to perform a first service from a target system user account, where the first service request includes information identifying the user account for both the source system and the target system. Sending the first service request to the target system to load a user account login interface for logging in to the target system user account through the source system. A first service performance result is received from the target system. A mapping relationship between the source system and the target system user account is stored. A second service request is received. The target system user account is identified based on the second service request and the stored mapping relationship. The second service request and the target system user account are sent to the target system for performing the second service.

17 Claims, 5 Drawing Sheets

(51) Int. Cl.
  *G06Q 20/22* (2012.01)
  *G06Q 20/10* (2012.01)
  *G06Q 20/02* (2012.01)
  *G06Q 20/40* (2012.01)
  *H04L 29/06* (2006.01)

(52) U.S. Cl.
  CPC ........... *G06Q 20/12* (2013.01); *G06Q 20/227* (2013.01); *G06Q 20/4014* (2013.01); *H04L 63/0815* (2013.01); *H04L 63/083* (2013.01)

(56) References Cited

U.S. PATENT DOCUMENTS

| | | | |
|---|---|---|---|
| 2002/0152156 A1* | 10/2002 | Tyson-Quah | G06Q 20/10 705/38 |
| 2004/0133509 A1* | 7/2004 | McCoy | G06Q 20/02 705/39 |
| 2005/0131806 A1* | 6/2005 | Barry | G06Q 20/04 705/39 |
| 2006/0229977 A1 | 10/2006 | Schleicher | |
| 2007/0240206 A1* | 10/2007 | Wu | H04L 63/0815 726/8 |
| 2007/0276730 A1 | 11/2007 | Lee et al. | |
| 2011/0238570 A1* | 9/2011 | Li | G06Q 30/06 705/40 |
| 2012/0011065 A1 | 1/2012 | Winfield-Chislett et al. | |
| 2012/0124676 A1 | 5/2012 | Griffin et al. | |
| 2014/0101036 A1 | 4/2014 | Phillips et al. | |
| 2014/0164254 A1 | 6/2014 | Dimmick | |
| 2014/0337183 A1 | 11/2014 | Li et al. | |
| 2015/0066620 A1 | 3/2015 | Roskind | |
| 2015/0278816 A1 | 10/2015 | Fleishman et al. | |
| 2015/0356533 A1 | 12/2015 | Hazlehurst | |
| 2016/0180333 A1* | 6/2016 | Leyva | G06Q 20/363 705/41 |
| 2016/0275486 A1* | 9/2016 | Liu | G06Q 20/325 |

FOREIGN PATENT DOCUMENTS

| | | | |
|---|---|---|---|
| CN | 104838399 | 8/2015 | |
| EP | 2869525 | 5/2015 | |
| JP | 2006127312 | 5/2006 | |
| JP | 2010506262 | 4/2008 | |
| JP | 2008176462 | 7/2008 | |
| JP | 2012501013 | 2/2010 | |
| WO | WO-02058017 A1 * | 7/2002 | ............ G06Q 20/04 |

OTHER PUBLICATIONS

Handt, C. (1999). Creating a global payments platform. TMA Journal, 19(3), 52-54. Retrieved from https://dialog.proquest.com/professional/docview/225957920?accountid=131444 on Aug. 6, 2021 (Year: 1999).*
International Preliminary Report on Patentability in International Application No. PCT/CN2016/108773, dated Jun. 19, 2018, 9 pages (with English Translation).
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
International Search Report by the International Searching Authority issued in International Application No. PCT/CN2016/108773 dated Jun. 22, 2017; 8 pages.
Extended European Search Report issued in EP Application No. 16874772.3 dated Aug. 21, 2018; 11 pages.
Anonymous: "Account aggregation", Dec. 4, 2015 (Dec. 4, 2015). XP055498948, Retrieved from the Internet: URL: https://en.wikipedia.org/w/index.php?title=Account_aggregation&oldid=693719619.
"Whmcs Global Services: ""Alipay Cross-Border Payment Gateway For Whmcs"", Dec. 17, 2014 (Dec. 17, 2014), XP054978575,Retrieved from the Internet: URL:https:www.youtube.com/watch?v=w_fBZq SmS5E".

* cited by examiner

ENHANCING PERFORMANCE OF INTER-SYSTEM SERVICE OPERATIONS

This application is a continuation of PCT Application No. PCT/CN2016/108773, filed on Dec. 7, 2016, which claims priority to Chinese Patent Application No. 201510947116.0, filed on Dec. 17, 2015, and each application is hereby incorporated by reference in its entirety.

TECHNICAL FIELD

The present application relates to the field of computer technologies, and in particular, to a method for performing an inter-system service operation, a service platform, and a target system.

BACKGROUND

In conventional technologies, during execution of an inter-system (inter-station) service operation, a source system can send a service request to a service platform, and then the service platform forwards the service request to a target system. After receiving the service request, the target system returns address information of the target system to the source system by using the service platform, so that the source system can jump to a login interface of the target system based on the address information. The target system can receive account and password information of the target system that are input by a user on the login interface, performs a service operation corresponding to the service request after the account and the password of the target system are verified, and returns an execution result to the source system by using the service platform. It can be seen that in the existing technologies, when the source system implements a jump operation to the target system, the user needs to input account and password information to the target system, which affects service operation execution efficiency, and can result in poor user experience.

SUMMARY

Implementations of the present application provide a method for performing an inter-system service operation, a service platform, and a target system to increase inter-system service operation execution efficiency.

According to a first aspect, a method for performing an inter-system service operation is provided, where the method includes: receiving, by a service platform, a first service request sent by a source system, where the first service request includes a source system account and information about a target system; retrieving a target system account from a predetermined storage unit based on the source system account and the information about the target system, where the predetermined storage unit is configured to store a source system account and information of another system that are bound to the source system account; sending the first service request and the target system account to the target system, so that the target system performs a service operation corresponding to the first service request after verifying the target system account; and receiving a first execution result returned by the target system, and forwarding the first execution result to the source system.

According to a second aspect, a method for performing an inter-system service operation is provided, where the method includes: receiving, by a target system, a first service request and a target system account that are sent by a service platform; after the target system account is verified, performing a service operation corresponding to the first service request to obtain a first execution result; and returning the first execution result to the service platform.

According to a third aspect, a service platform is provided, where the service platform includes a receiving unit, a retrieving unit, and a sending unit; the receiving unit is configured to receive a first service request sent by a source system, where the first service request includes a source system account and information about a target system; the retrieving unit is configured to retrieve a target system account from a predetermined storage unit based on the source system account and the information about the target system that are received by the receiving unit, where the predetermined storage unit is configured to store a source system account and information of another system that are bound to the source system account; the sending unit is configured to send, to the target system, the first service request and the target system account that is retrieved by the retrieving unit, so that the target system performs a service operation corresponding to the first service request after verifying the target system account; and the receiving unit is further configured to receive a first execution result returned by the target system, and forward the first execution result to the source system.

According to a fourth aspect, a target system is provided, where the target system includes a receiving unit, an execution unit, and a sending unit; the receiving unit is configured to receive a first service request and a target system account that are sent by a service platform; the execution unit is configured to after the target system account that is received by the receiving unit is verified, perform a service operation corresponding to the first service request to obtain a first execution result; and the sending unit is configured to return the first execution result to the service platform.

According to the method for performing an inter-system service operation, the service platform, and the target system provided in the present application, when receiving the service request sent by the source system, the service platform retrieves the target system account based on the source system account and the information about the target system that are included in the service request, and sends the service request and the target system account to the target system, so that the target system performs the service operation corresponding to the service request after verifying the target system account, and returns the execution result. It can be seen that, in the implementations of the present application, it is unnecessary to receive the account and password information of the target system that are input by a user. Therefore, inter-system service operation execution efficiency can be increased, and user experience can be improved.

DESCRIPTION OF EMBODIMENTS

To make the objectives, technical solutions, and advantages of the implementations of the present application clearer, the following describes the technical solutions in the implementations of the present application with reference to the accompanying drawings in the implementations of the present application. Apparently, the described implementations are merely some rather than all of the implementations of the present application. All other implementations obtained by a person of ordinary skill in the art based on the implementations of the present application without creative efforts shall fall within the protection scope of the present application.

For better understanding of the implementations of the present application, the following further describes specific implementations with reference to the accompanying drawings, and the implementations do not limit the scope of the present application.

A method for performing an inter-system service operation provided in the implementations of the present application is applicable to scenarios that a service operation is performed by using at least two systems, for example, a scenario that a user pays by using two payment systems.

It is worthwhile to note that, in the implementations of the present application, an example that a user pays by using two payment systems (for example, a service request can be a payment request) is used. Methods for performing service operations other than a payment operation by using more than two systems can be similarly implemented, and are not separately described to avoid duplications.

The two payment systems can be a source system (INBOUND) and a target system (OUTBOUND), and the source system and the target system are separately used to identify different currencies. For example, the source system can be a payment system (such as the JPAY checkout counter) that a merchant website of country A subscribes to, and is used to identify an XX currency, and the target system can be a payment system (such as the ALIPAY system) that a user of country B registers with, and is used to identify a YY currency. It is worthwhile to note that both the source system and the target system are bound to a service platform (such as the ALIPAY PLUS GLOBAL NET), and the service platform is mainly used to provide services, such as Internet payment collection services, currency exchange service, fund clearance services for each payment system. It is worthwhile to note that after the source system is bound to the service platform, when receiving a payment request from a user and identifying that a current payment operation is an inter-system payment operation, the source system can forward the payment request to the service platform. After the service platform is bound to the target system, the target system returns an execution result to the service platform after performing a corresponding payment operation based on the received payment request. Then the service platform forwards the execution result to the source system.

Specifically, after the user of country B selects and orders a product on the merchant website of country A, when the user selects the target system as a payment platform, the source system identifies that the order is an inter-system order, that is, the source system sends a payment collection instruction to the target system through the GLOBALNET. The GLOBALNET performs fund clearance for the source system based on a clearance rule after the user pays for the product. The target system receives the payment collection instruction from the GLOBALNET, deducts a fund from a specified account (a target system account), and sends the fund to the GLOBALNET based on the clearance rule.

Figure 1:
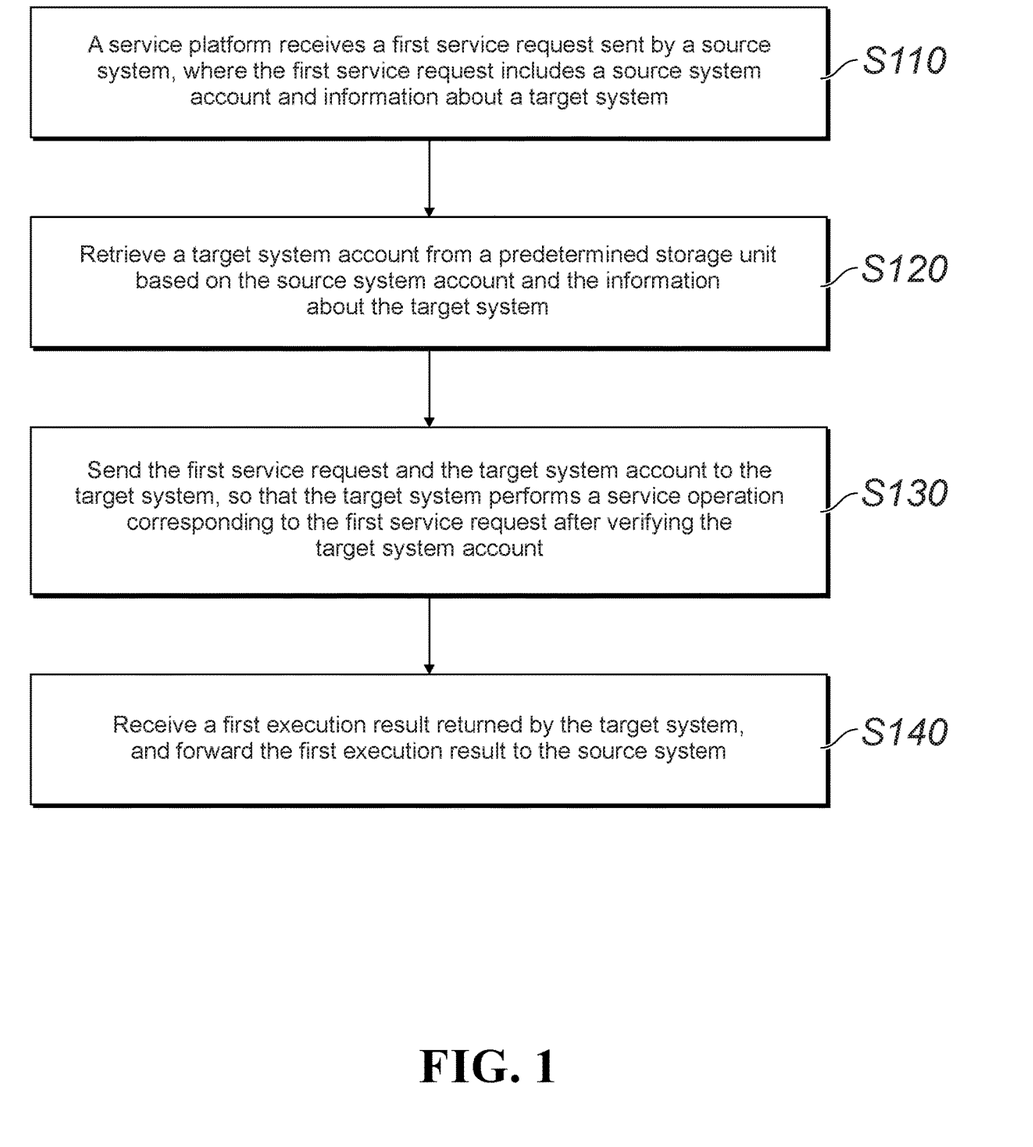
FIG. 1 is a flowchart illustrating a method for performing an inter-system service operation, according to an implementation of the present application.

FIG. 1 is a flowchart illustrating a method for performing an inter-system service operation, according to an implementation of the present application. The method can be performed by a device that has processing capabilities including a server, a system, or an apparatus (for example, a service platform). As shown in FIG. 1, the method can specifically include the following steps.

At S110: The service platform receives a first service request sent by a source system, where the first service request includes a source system account and information about a target system.

Here, the source system can be a payment system (such as the WAY checkout counter) that a merchant website of country A subscribes to, and is used to identify an XX currency, and the target system can be a payment system (such as, the ALIPAY system) that a user of country B registers with, and is used to identify a YY currency.

In addition, the information about the target system can include a name of the target system. An account used by the user of country B to log in to the source system can be referred to as the source system account.

For example, the service request is a payment request. After the user of country B selects and orders a product on the merchant website of country A, the merchant website implements a jump operation to the source system that the merchant website subscribes to. The user can select a payment platform from the source system. Assume that the received payment platform input by the user is the target system, the source system identifies a current payment operation as an inter-system payment operation, that is, the source system sends the first service request to the service platform.

Optionally, before S110, the method in this implementation of the present application can further include a step of storing a mapping relationship between the source system account and a target system account in a predetermined storage unit. Afterward, the service platform can retrieve the target system account based on the source system account and the information about the target system without requiring the user to input the account and password information at the target system. Therefore, payment operation performance efficiency can be increased, and user experience can be improved.

Specific sub-steps can be described as follows:

Step 1101: Receive a second service request sent by the source system, where the second service request includes the source system account and information about the target system.

The second service request can be sent when the source system identifies for the first time that a payment platform selected by the user corresponding to the source system account is the target system. The second service request can further include a payment amount.

Step 1102: Send the second service request to the target system based on the information about the target system, so as to load a login interface of the target system, and perform verification on the account and password information received from the login interface of the target system.

Here, the target system account can be the account used by the user of country B to log in to the target system in the previous example.

It is worthwhile to note that when the second service request further includes the payment amount, because the source system identifies the XX currency and the target system identifies the YY currency, the service platform can convert the payment amount based on an exchange rate between the XX currency and the YY currency to obtain a converted payment amount.

The second service request sent by the service platform to the target system can include the converted payment amount. After receiving the second service request, the target system can return address information (such as a URL address) of the target system to the source system by using the service platform, so that the source system can implement a jump operation to the login interface of the target system (that is, the login interface of the target system is loaded) based on the address information of the target system. The target system can receive the account and password information of the target system that are input by the user on the login interface, and perform verification on the received account and password of the target system. After passing verification, the target system can display an interface on which the user can select a payment tool and input a payment password. After the payment password received is verified, the target system can perform a service operation corresponding to the second service request, for example, deduct the converted payment amount from the target system account.

Step 1103: Receive a second execution result that is returned after the target system performs a service operation corresponding to the second service request when the verification passes, where the second execution result includes the target system account.

Optionally, the second execution result can further include result information indicating whether the service operation succeeds or not, for example, can include information about whether the deduction succeeds or not.

Step 1104: Store a mapping relationship between the source system account and the target system account in the predetermined storage unit.

That is, after receiving the target system account, the service platform can record a mapping relationship among the source system account, the information about the target system, and the target system account in the predetermined storage unit, where the source system account and the information about the target system are received in step 1101.

For example, content in the predetermined storage unit can be shown in Table 1.

TABLE 1

| Source system account | target system account | Name of target system |
|---|---|---|
| 11 | 22 | aa |
|  | 33 | bb |
| 22 | 44 | aa |

Accounts and names that are of target systems and that are bound to accounts of two source systems are stored in Table 1. It can be understood that, a target system account can be uniquely retrieved based on a source system account and a name of the target system.

Optionally, step 1104 can further include: sending the second execution result to the source system, so that the source system obtains a message indicating that the accounts are to be bound, and returns a storage instruction to the service system after obtaining the message indicating that the accounts are to be bound; and storing the mapping relationship between the source system account and the target system account in the predetermined storage unit based on the storage instruction.

Specifically, when receiving the second execution result sent by the target system, the service platform sends the second execution result to the source system. After receiving the second execution result, the source system can output a request for querying whether to bind the source system account to the target system account, and receive the message that is input by the user and that is used to indicate that the accounts are to be bound, that is, receive an authorization instruction of the user. In an implementation, the request can be output on a page, and the page can include an "OK" button. The source system receives the authorization instruction of the user once the source system receives a click instruction for the "OK" button.

After obtaining the message indicating that the accounts are to be bound, the source system can send the storage instruction to the service platform. The storage instruction is used to instruct the service platform to load a page for setting an inter-system payment password. After receiving inter-system payment password input by the user, the service platform encrypts and stores the password locally, so as to perform verification on an inter-system payment password input by the user subsequently.

Certainly, in an actual application, the source system can prestore address information of the page of the service platform for setting an inter-system payment password. After obtaining the message indicating that the accounts are to be bound, the source system implements, based on the address information, a jump operation to the page for setting an inter-system payment password. After receiving inter-system payment password input by the user, the service platform encrypts and stores the password locally, so as to perform verification on an inter-system payment password input by the user subsequently.

After obtaining the inter-system payment password input by the user, the service platform can store the mapping relationship between the source system account and the target system account in the predetermined storage unit.

Optionally, after step 1104, the method can further include the following step: adding identification information to the target system account, so that when performing verification on the target system account again, the target system performs verification only on the target system account without performing verification on the password.

That is, assume that content in the predetermined storage unit is shown in Table 1, and assume that the target system account that is included in the payment request received by the target system is "22", because "22" is an account bound to the source system account, and the target system has added the identification information to the account, the target system performs a corresponding payment operation provided that the target system account is verified, without performing verification on the password corresponding to the account again.

At S120: Retrieve a target system account from a predetermined storage unit based on the source system account and the information about the target system, where the predetermined storage unit is configured to store source system account and information of another system that are bound to the source system account.

For example, assume that the source system account included in the first service request is "11", and a name of the target system is "aa", the account "22" of the target system can be retrieved from Table 1. That is, when a user corresponding to "11" logs in to the target system from the source system, the user does not need to input "22" and the password again, but instead, the service platform directly retrieves "22" corresponding to "11", and adds the target system account to the payment request to be sent to the target system.

It is worthwhile to note that if the service platform cannot retrieve the account and the password of the target system, step 1101 to step 1104 are performed to store the mapping relationship between the source system account and the target system account in the storage unit.

At S130: Send the first service request and the target system account to the target system, so that the target system performs a service operation corresponding to the first service request after verifying the target system account.

Optionally, after retrieving the target system account, the service platform can further verify whether to use the retrieved target system account. Specifically, the service platform can output, to the user, a request for querying whether to use the retrieved target system account, and when receiving information indicating that the retrieved target system account is to be used, receive an inter-system payment password input by the user, and send the first service request and the target system account to the target system when the received inter-system password payment input by the user is consistent with the locally prestored inter-system payment password (that is, when the inter-system payment password is verified).

In the previous example, the target system can receive the first service request and "22", and because "22" is an account pre-registered by the user in the target system, that is, "22" has been stored in the target system, the target system account is verified. In addition, because the target system has added the identification information to the target system account that is in the predetermined storage unit and that is bound to the source system account, that is, the target system does not need to perform verification on the password corresponding to the target system account, the target system performs the service operation corresponding to the first service request provided that the target system account is verified, for example, performs a payment operation, that is, deducts the converted payment amount from the target system account.

For example, the target system can transfer the converted payment amount deducted from the target system account to a temporary account of the service platform, and then the service platform transfers the corresponding payment amount to the source system account.

At S140: Receive a first execution result returned by the target system, and forward the first execution result to the source system.

For example, the service platform receives the first execution result after the target system performs the payment operation. The first execution result can include a message indicating whether the payment operation succeeds or not.

After receiving the first execution result, the source system can implement a jump operation back to a merchant system, so that the user can select another product.

According to the method for performing an inter-system service operation provided in the present application, when receiving the service request sent by the source system, the service platform retrieves the target system account based on the source system account and the information about the target system that are included in the service request, and logs in to the target system based on the retrieved target system account, so that the target system performs the service operation corresponding to the service request, and returns the execution result. It can be seen that, in this implementation of the present application, it is unnecessary to receive the account and the password of the target system that are input by the user. Therefore, inter-system service operation execution efficiency can be increased, and user experience can be improved.

Figure 2:
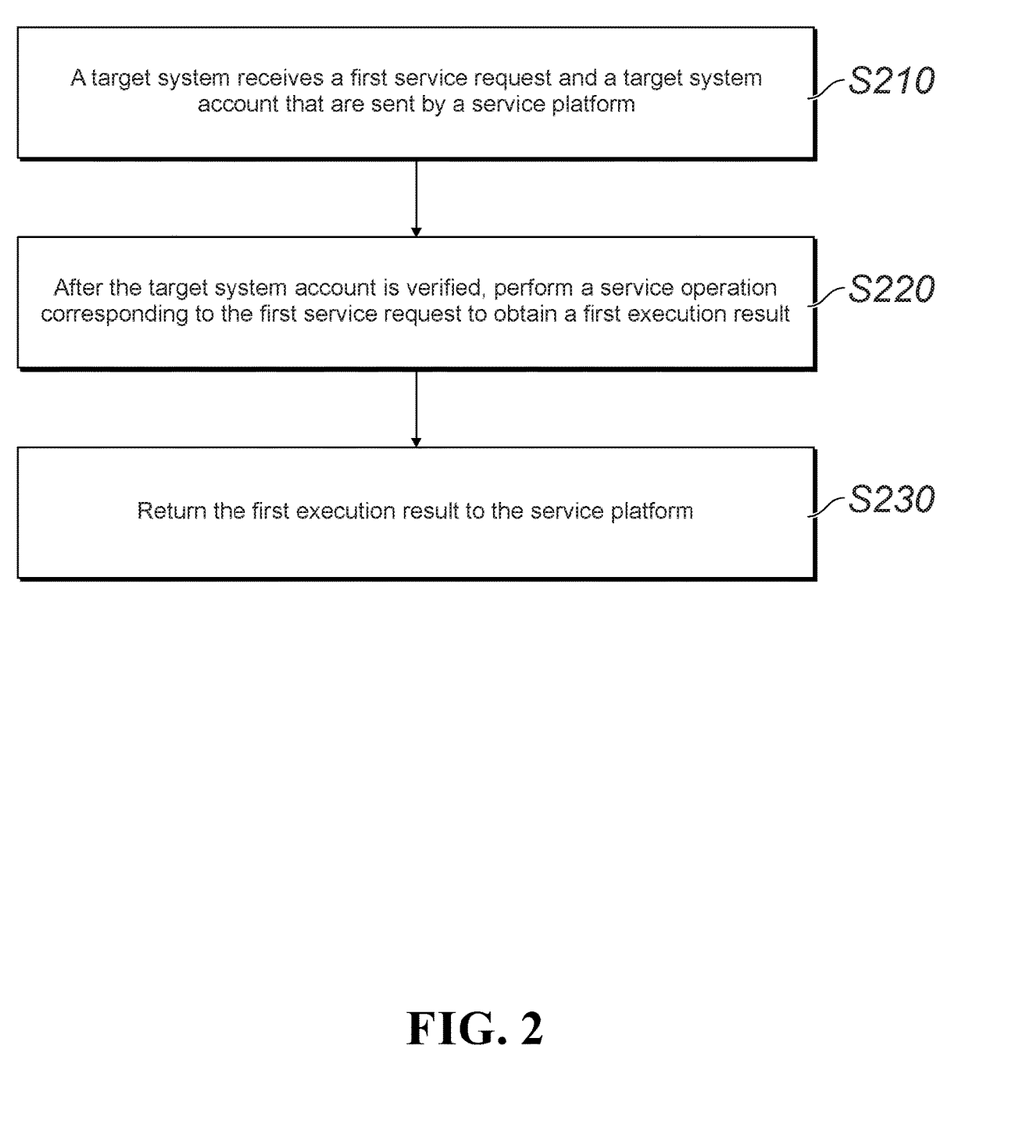
FIG. 2 is a flowchart illustrating a method for performing an inter-system service operation, according to another implementation of the present application.

FIG. 2 is a flowchart illustrating a method for performing an inter-system service operation, according to another implementation of the present application. The method can be performed by a device that has processing capabilities including a server, a system, or an apparatus (for example, a target system). As shown in FIG. 2, the method can specifically include the following steps.

At S210: The target system receives a first service request and a target system account that are sent by a service platform.

Here the target system can be a payment system (such as the ALIPAY system) that a user of country B registers with, and is used to identify a YY currency. An account used by the user of country B to log in to the target system is referred to as the target system account.

For example, the service request is a payment request. After the user of country B selects and orders a product on a merchant website of country A, the merchant website implements a jump operation to a source system that the merchant website subscribes to. The user can select a payment platform from the source system. Assume that the received payment platform input by the user is the target system, the source system identifies a current payment operation as an inter-system payment operation, that is, the source system sends the first service request to the service platform. After receiving the first service request, the service platform forwards the first service request to the target system, and can further send the target system account to the target system.

The source system can be a payment system (such as the WAY checkout counter) that the merchant website of country A subscribes to, and is used to identify an XX currency. An account used by the user of country B to log in to the source system can be referred to as a source system account.

The target system account that is sent by the service platform to the target system can be retrieved from a predetermined storage unit, that is, retrieved from the predetermined storage unit based on the source system account and information about the target system that are included in the first service request received from the source system, and the information about the target system can be a name of the target system, etc.

A mapping relationship between the source system account and the target system account can be established in the predetermined storage unit by using the following substeps.

Step 2101: The target system loads a login interface of the target system based on a second service request received from the service platform.

Here the second service request can include a converted payment amount, and the converted payment amount is converted by the service platform from the payment amount based on an exchange rate between the XX currency and the YY currency.

After receiving the second service request, the target system can return address information (such as a URL address) of the target system to the source system by using the service platform, so that the source system can implement a jump operation to the login interface of the target system (that is, the login interface of the target system is loaded) based on the address information of the target system.

Step 2102: Obtain the account and password information of the target system from the login interface, and perform verification on the account and the password of the target system.

The target system can receive the account and the password of the target system that are input by the user on the login interface, and perform verification on the received account and the received password of the target system.

Step 2103: After the account and the password of the target system are verified, perform a service operation corresponding to the second service request to obtain a second execution result.

After the verification passes, the target system can display an interface on which the user needs to select a payment tool and input a payment password. After the payment password received is verified, the target system can perform the service operation corresponding to the second service request, for example, deduct the converted payment amount from the target system account.

Step 2104: Return the second execution result to the service platform, where the second execution result includes the target system account, so that the service platform stores the target system account.

Optionally, the second execution result can further include result information indicating whether the service operation succeeds or not, for example, can include information about whether the deduction succeeds or not.

That is, after receiving the target system account, the service platform can record a mapping relationship among the received source system account, the received information about the target system, and the received target system account in the predetermined storage unit.

For example, content in the predetermined storage unit can be shown in Table 1.

Accounts and names that are of target systems and that are bound to accounts of two source systems are stored in Table 1. It can be understood that, a target system account can be uniquely retrieved based on a source system account and a name of the target system.

Optionally, that the service platform stores the mapping relationship between the source system account and the target system account in the predetermined storage unit can be specifically as follows: When receiving the second execution result sent by the target system, the service platform sends the second execution result to the source system. After receiving the second execution result, the source system can output a request for querying whether to bind the source system account to the target system account, and receive a message that is input by the user and that is used to indicate that the accounts are to be bound, that is, receive an authorization instruction of the user. In an implementation, the request can be output on a page, and the page can include an "OK" button. The source system receives the authorization instruction of the user once the source system receives a click instruction for the "OK" button.

After obtaining the message indicating that the accounts are to be bound, the source system can send a storage instruction to the service platform. The storage instruction is used to instruct the service platform to load a page for setting an inter-system payment password. After receiving an inter-system payment password input by the user, the service platform encrypts and stores the password locally, so as to perform verification on an inter-system payment password input by the user subsequently.

Certainly, in an actual application, the source system can prestore address information of the page of the service platform for setting an inter-system payment password. After obtaining the message indicating that the accounts are to be bound, the source system implements, based on the address information, a jump operation to the page for setting an inter-system payment password. After receiving the inter-system payment password input by the user, the service platform encrypts and stores the password locally, so as to perform verification on an inter-system payment password input by the user subsequently.

After obtaining the inter-system payment password input by the user, the service platform can store the mapping relationship between the source system account and the target system account in the predetermined storage unit.

Optionally, after the account and the password of the target system are verified, the method further includes: adding identification information to the target system account, so that when performing verification on the target system account again, the target system performs verification only on the target system account without performing verification on the password.

That is, assume that content in the predetermined storage unit is shown in Table 1, and assume that the target system account that is included in the payment request received by the target system is "22", because "22" is an account bound to the source system account, and the target system has added the identification information to the account, the target system performs a corresponding payment operation provided that the target system account is verified, without performing verification on the password corresponding to the account again.

At S210, after retrieving the target system account, the service platform can further verify whether to use the retrieved target system account. Specifically, the service platform can output, to the user, a request for querying whether to use the retrieved target system account, and when receiving information indicating that the retrieved target system account is to be used, receive an inter-system payment password input by the user, and send the first service request and the target system account to the target system when the received inter-system password payment input by the user is consistent with the locally prestored inter-system payment password (that is, when the inter-system payment password is verified).

At S220: After the target system account is verified, perform a service operation corresponding to the first service request to obtain a first execution result.

In the previous example, the target system can receive the first service request and "22", and because "22" is an account pre-registered by the user in the target system, that is, "22" has been stored in the target system, the target system account is verified. In addition, because the target system has added the identification information to the target system account that is in the predetermined storage unit and that is bound to the source system account, that is, the target system does not need to perform verification on the password corresponding to the target system account, the target system performs the service operation corresponding to the first service request provided that the target system account is verified, for example, performs a payment operation, that is, deducts the converted payment amount from the target system account.

At S230: Return the first execution result to the service platform.

For example, after performing the payment operation and obtaining the first execution result, the target system can return the first execution result to the service platform. The first execution result can include a message indicating whether the payment operation succeeds or not.

After receiving the first execution result, the source system can implement a jump operation back to a merchant system, so that the user can select another product.

According to the method for performing an inter-system service operation provided in the present application, when receiving the service request sent by the source system, the service platform retrieves the target system account based on the source system account and the information about the target system that are included in the service request, and logs in to the target system based on the retrieved target system account, so that the target system performs the service operation corresponding to the service request, and returns the execution result. It can be seen that, in this implementation of the present application, it is unnecessary to receive the account and the password of the target system that are input by the user. Therefore, inter-system service operation execution efficiency can be increased, and user experience can be improved.

Figure 3:
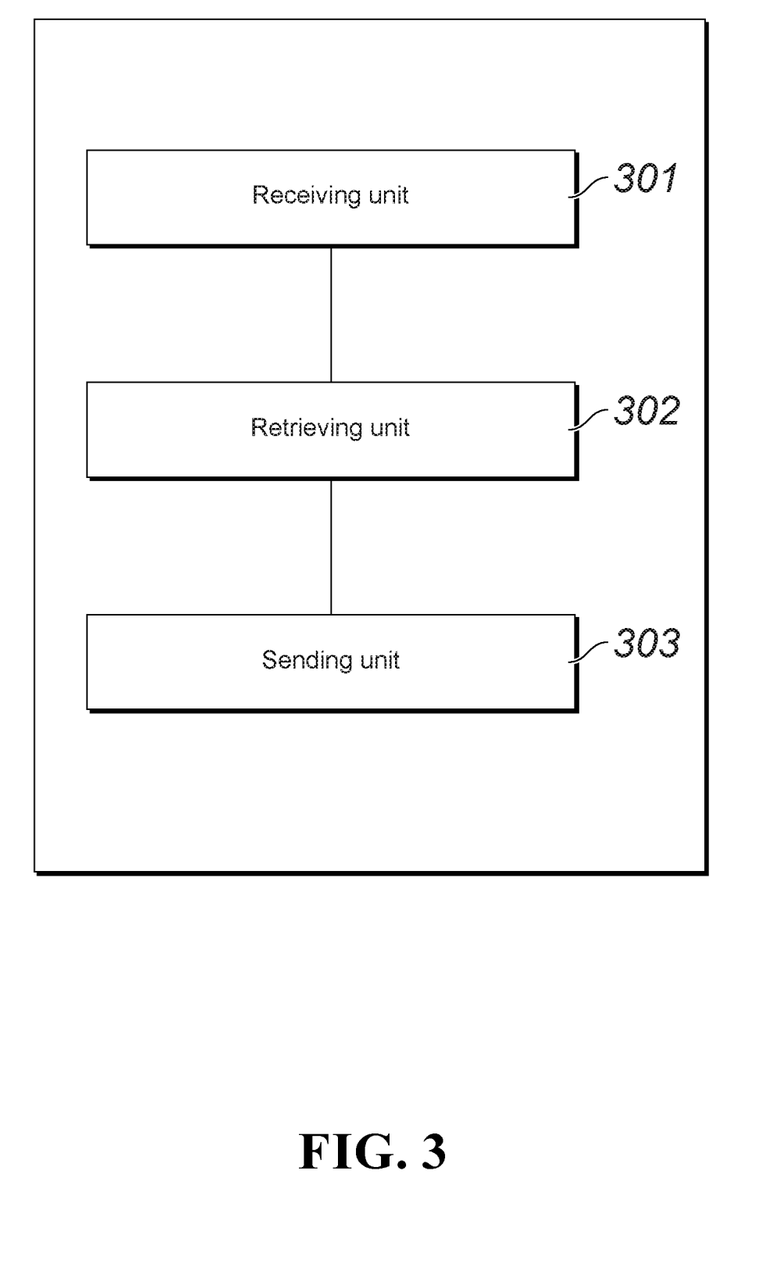
FIG. 3 is a schematic diagram illustrating a service platform, according to still another implementation of the present application.

Corresponding to the method for performing an inter-system service operation provided in the described implementation, an implementation of the present application further provides a service platform. As shown in FIG. 3, the service platform includes a receiving unit 301, a retrieving unit 302, and a sending unit 303.

The receiving unit 301 is configured to receive a first service request sent by a source system, where the first service request includes a source system account and information about a target system.

The retrieving unit 302 is configured to retrieve a target system account from a predetermined storage unit based on the source system account and the information about the target system that are received by the receiving unit 301, where the predetermined storage unit is configured to store an account and information of another system that are bound to the source system account.

The sending unit 303 is configured to send, to the target system, the first service request and the target system account that is retrieved by the retrieving unit 302, so that the target system performs a service operation corresponding to the first service request after verifying the target system account.

The receiving unit 301 is further configured to receive a first execution result returned by the target system, and forward the first execution result to the source system.

Optionally, the service platform further includes a saving unit 304.

The receiving unit 301 is further configured to receive a second service request sent by the source system, where the second service request includes the source system account and the information about the target system.

The sending unit 303 is further configured to send the second service request to the target system based on the information about the target system that is received by the receiving unit 301, so as to load a login interface of the target system, and perform verification on the account and password information of the target system that are received from the login interface.

The receiving unit 301 is further configured to receive a second execution result that is returned after the target system performs a service operation corresponding to the second service request when the verification passes, where the second execution result includes the target system account.

The saving unit 304 is configured to store a mapping relationship between the source system account and the target system account in the predetermined storage unit.

The saving unit 304 is specifically configured to send the second execution result to the source system, so that the source system obtains a message indicating that the accounts are to be bound, and returns a storage instruction to the service system after obtaining the message indicating that the accounts are to be bound; and store the mapping relationship between the source system account and the target system account in the predetermined storage unit based on the storage instruction.

Optionally, the service platform is applied to inter-system login during payment, and the service request is a payment request.

Functions of functional modules of the apparatus in this implementation of the present application can be implemented by performing the steps in the described method implementation. Therefore, a specific working process of the apparatus provided in the present application is not described here again.

According to the service platform provided in the present application, the receiving unit 301 receives the first service request sent by the source system, where the first service request includes the source system account and the information about the target system; the retrieving unit 302 retrieves the target system account from the predetermined storage unit based on the source system account and the information of the target system, where the predetermined storage unit is configured to store an account and information of another system that are bound to the source system account; the sending unit 303 sends the first service request and the target system account to the target system, so that the target system performs the service operation corresponding to the first service request after verifying the target system account; and the receiving unit 301 receives the first execution result returned by the target system, and forwards the first execution result to the source system. Therefore, inter-system service operation execution efficiency can be increased, and user experience can be improved.

Figure 4:
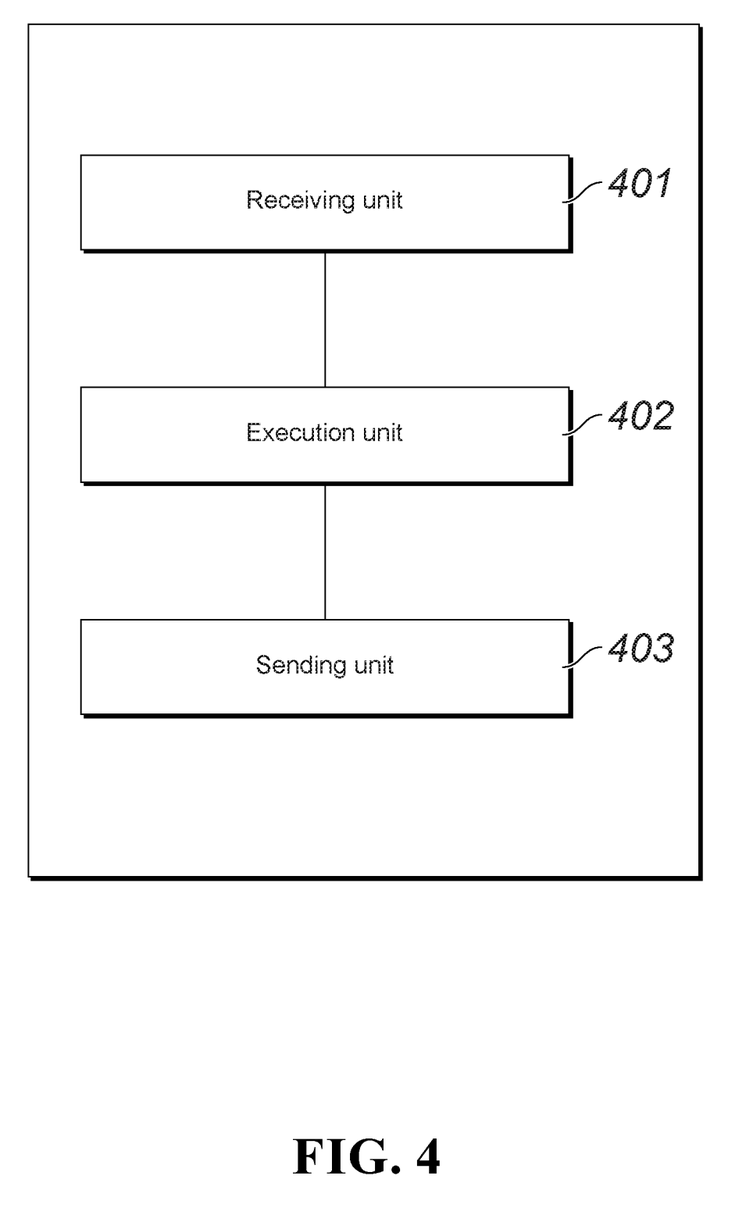
FIG. 4 is a schematic diagram illustrating a target system, according to yet another implementation of the present application.

Corresponding to the method for performing an inter-system service operation provided in another described implementation, an implementation of the present application further provides a target system. As shown in FIG. 4, the target system includes a receiving unit 401, an execution unit 402, and a sending unit 403.

The receiving unit 401 is configured to receive a first service request and a target system account that are sent by a service platform.

The execution unit 402 is configured to after the target system account that is received by the receiving unit 401 is verified, perform a service operation corresponding to the first service request to obtain a first execution result.

The sending unit 403 is configured to return the first execution result to the service platform.

Optionally, the target system further includes a loading unit 404 and an acquisition unit 405.

The loading unit 404 is configured to load a login interface of the target system based on a second service request received from the service platform.

The acquisition unit 405 is configured to obtain the account and password information of the target system from the login interface loaded by the loading unit 404, and perform verification on the account and the password of the target system.

The execution unit 402 is further configured to after the account and the password of the target system that are obtained by the acquisition unit 405 are verified, perform a service operation corresponding to the second service request to obtain a second execution result.

The sending unit 403 is further configured to return the second execution result obtained by the execution unit 402 to the service platform, where the second execution result includes the target system account, so that the service platform stores the target system account.

Optionally, the target system further includes an adding unit 406.

The adding unit 406 is configured to add identification information to the target system account, so that when performing verification on the target system account again, the target system performs verification only on the target system account without performing verification on the password.

Functions of functional modules of the apparatus in this implementation of the present application can be implemented by performing the steps in the described method implementation. Therefore, a specific working process of the apparatus provided in the present application is not described here again.

According to the target system provided in the present application, the receiving unit 401 receives the first service request and the target system account that are sent by the service platform; and after the target system account is verified, the execution unit 402 performs the service operation corresponding to the first service request to obtain the first execution result; and the sending unit 403 returns the first execution result to the service platform. Therefore, inter-system service operation execution efficiency can be increased, and user experience can be improved.

A person skilled in the art can be further aware that, in combination with the examples described in the implementations disclosed in this specification, objects and algorithm steps can be implemented by electronic hardware, computer software, or a combination thereof. To describe the interchangeability between the hardware and the software, compositions and steps of each example have been described above according to functions. Whether the functions are performed by hardware or software depends on particular applications and design constraint conditions of the technical solutions. A person skilled in the art can use different methods to implement the described functions for each particular application, but it should not be considered that the implementations go beyond the scope of the present application.

Steps of methods or algorithms described in the implementations disclosed in this specification can be implemented by hardware, a software module executed by a processor, or a combination thereof. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the described specific implementations, the objective, technical solutions, and benefits of the present application are further described in detail. It should be understood that the descriptions are merely specific implementations of the present application, but are not intended to limit the protection scope of the present application. Any modification, equivalent replacement, or improvement made without departing from the spirit and principle of the present application should fall within the protection scope of the present application.

Figure 5:
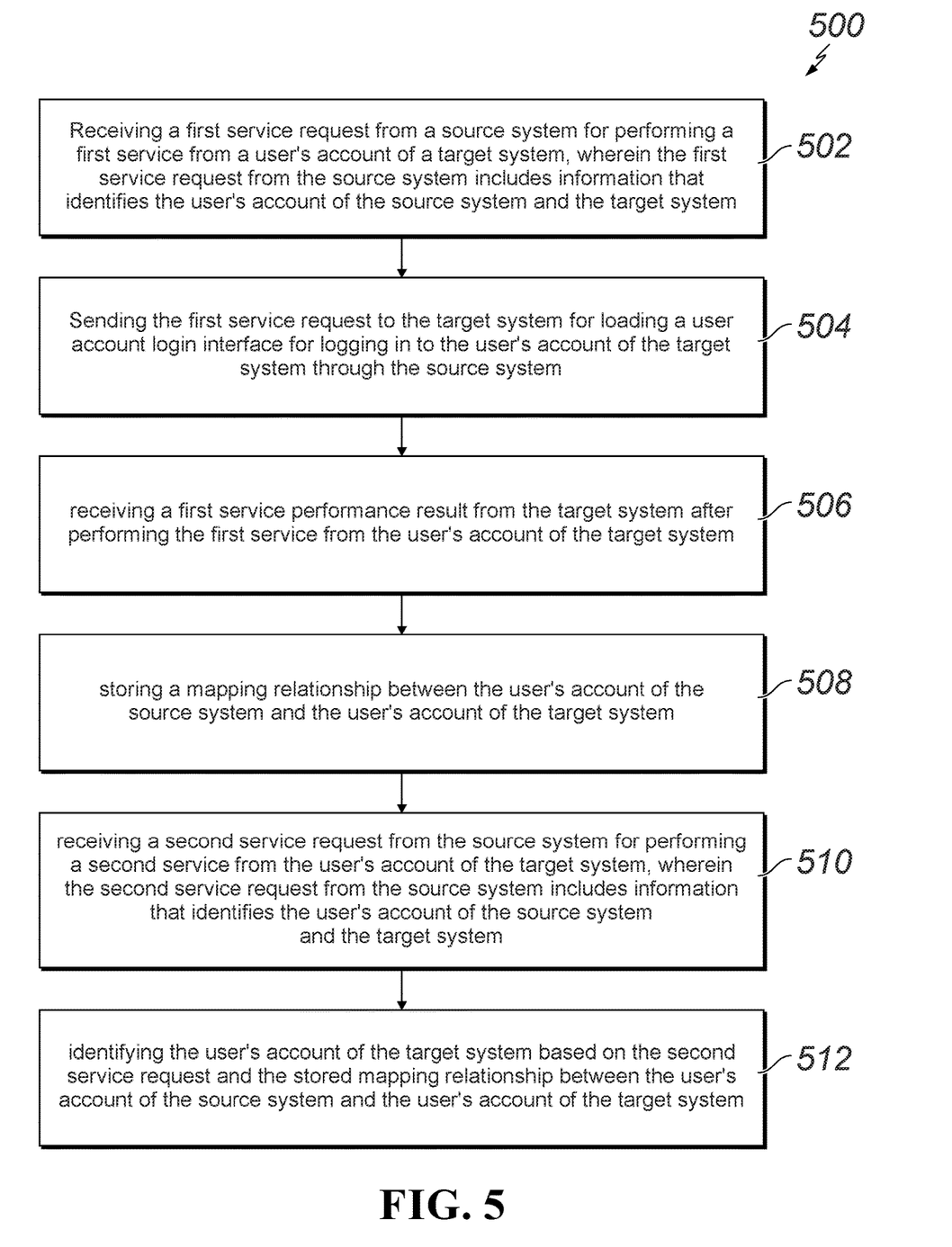
FIG. 5 is a flowchart illustrating an example of a computer-implemented method for performing an inter-system service operation, according to an implementation of the present disclosure.

FIG. 5 is a flowchart illustrating an example 500 of a computer-implemented method for performing an inter-system service operation, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order. In some cases, method 500 can be performed by a service platform such as ALIPAY PLUS GLOBAL NET (GLOBALNET).

At 502, a first service request from a source system for performing a first service from a user's account of a target system is received, wherein the first service request from the source system includes information that identifies a user's account of the source system and the user's account of the target system. From 502, method 500 proceeds to 504.

At 504, the first service request is sent to the target system for loading a user account login interface for logging in to the user's account of the target system through the source system. In some cases, the first service request can be a payment request and the target system can be identified based on a payment method selected by the user. For example, if the payment method selected by the user is ALIPAY, the target system can be an ALIPAY system. If a payment account associated with ALIPAY is registered in China, the payment currency can be identified as Chinese RMB. Both the source system and the target system can be bound to the service platform (for example, GLOBALNET). From 504, method 500 proceeds to 506.

At 506, a first service performance result is received from the target system after performing the first service from the user's account of the target system. In some cases, the first service performance result can identify whether the payment request is successfully processed through the target system. For example, assume that a user makes an order from an online shopping website of country A through a user account associated with the online shopping website. Assume that the online shopping web site uses JPAY as the payment system (source system). The user's payment account is associated with ALIPAY (target system). After the user logs in to the user account associated with the online shopping website (source system), it can log in to its ALIPAY account and select ALIPAY as the payment system (target system). The source system can identify that the order is an inter-system order. The source system can send a payment instruction to the target system through a payment platform (for example, GLOBALNET). The GLOBALNET can perform fund clearance for the source system based on a clearance rule after the user pays through the target system. After the target system receives the payment instruction from the GLOBALNET, it can deduct the corresponding payment amount from the user's ALIPAY account, and send the payment to GLOBALNET based on the clearance rule to fund the WAY account associated with the online shopping web site.

In some cases, the payment request includes a payment amount of a first currency used by the source system different from a second currency used by the target system. For example, the WAY system (source system) may use US dollars as default payment currency while the ALIPAY system (target system) may use Chinese RMB as default payment currency. In such cases, the service platform can convert the payment amount of the first currency to a payment account of the second currency based on a currency exchange rate. The payment amount of the second currency can then be sent to the target system for requesting payment from the target system. In some cases, the service platform can also receive the payment with the payment amount of the second currency from the target system and save the payment from the target system to a temporary account. The service platform can transfer the payment of the payment amount of the first currency to the source system after the transaction is cleared. From 506, method 500 proceeds to 508.

At 508, a mapping relationship between the user's account of the source system and the user's account of the target system is stored. In some cases, the mapping relationship can include the mapping relationship between the user's account of the source system (for example, the user's JPAY account or online shopping account associated with WAY) and the user's account of the target system (for example, the user's ALIPAY account). In some cases, the mapping relationship can also identify the name of the target system (for example, ALIPAY) such as the mapping relationship shown in Table 1. After storing the mapping relationship, the user's source system account and target system account are bound to the service platform. In other words, the service platform can know that the two accounts are associated with the same user, permission to access one account can be automatically granted if the user successfully logged on to another. From 508, method 500 proceeds to 510.

At 510, a second service request from the source system for performing a second service from the user's account of the target system is received, wherein the second service request from the source system includes information that identifies the user's account of the source system and the target system. From 510, method 500 proceeds to 512.

At 512, the user's account of the target system is identified based on the second service request and the stored mapping relationship between the user's account of the source system and the user's account of the target system. Because the user's account of the source system and the user's account of the target system are both bound to the service platform, the service platform can refer to the mapping relationship (for example, Table 1) to identify that the user's account of the source system and the user's account of the target system belong to the same user. As such, the service platform can automatically login the user to the target system and request the service to be performed by the target system. After 512, method 500 stops.

Implementations of the subject matter described in this specification can be implemented so as to realize particular advantages or technical effects. For example, implementations of the subject matter permit a request for a two-dimensional code from a code display client to be made to a server. The server receives the request and generates the requested two-dimensional code for display on a two-dimensional code display client. The generated two-dimensional code can be scanned from the two-dimensional code display client through user interaction (for example, a touch or swipe interaction) with a graphical user interface of a two-dimensional code scanning client. The server provides a verification of the validity of the scanned two-dimensional code. The validity result can be displayed on a graphical user interface of the two-dimensional code scanning client. Based on the validity determination, a determination of whether to perform subsequent actions (for example, using the two-dimensional code scanning client to complete a transaction, transmit data, or store information) can be made.

The described methodology improves inter-system service efficiency and corresponding user experience. An overarching service platform can receive a service request sent from a user account of a source system, identify and retrieve a target system account of the user based on a pre-stored mapping relationship with the source system account, and accesses the target system based on the retrieved target system account without requiring the user to enter login information to access the target system account.

The described methodology can ensure the efficient usage of computer resources (for example, processing cycles, network bandwidth, and memory usage), through the efficient data access/transactions. At least these actions can minimize or prevent waste of available computer resources with respect to multiple parties/systems in mobile computing transactions by simplifying user account access and service conversion procedure across different systems.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
receiving, by a service platform, a first service request from a source system for performing a first service from a user's account of a target system, wherein the first service request from the source system comprises a first payment request and includes information that identifies a user's account of the source system and information of the target system that is bound to the user's account of the source system, wherein a user is associated with both the user's account of the source system and the user's account of the target system;
sending, by the service platform, the first service request to the target system for loading a user account login interface for logging in to the user's account of the target system through the source system;
after sending the first service request to the target system, receiving, by the service platform, a first service performance result from the target system after performing the first service from the user's account of the target system, wherein the first service performance result comprises login information of the user's account of the target system, and wherein the login information of the user's account of the target system is verified by the target system using account and password information of the user's account of the target system that are input through the user account login interface by the user associated with both the user's account of the source system and the user's account of the target system;
after receiving the first service performance result from the target system, storing, by the service platform and in a computer-readable predetermined storage unit of the service platform, a mapping relationship between the user's account of the source system and the user's account of the target system;

receiving, by the service platform, a second service request from the source system for performing a second service from the user's account of the target system, wherein the second service request from the source system comprises a second payment request and includes the information that identifies the user's account of the source system and the information of the target system;

identifying, by the service platform, the user's account of the target system based on the second service request and the mapping relationship between the user's account of the source system and the user's account of the target system;

sending, by the service platform, the second service request and the user's account of the target system to the target system; and performing, by the service platform, an operation of logging in to the user's account of the target system using the login information of the user's account of the target system, without requiring input of login related information from the user.

2. The computer-implemented method of claim 1, wherein the service platform coordinates the source system and the target system.

3. The computer-implemented method of claim 1, wherein the target system is identified based on a payment method selected by the user.

4. The computer-implemented method of claim 1, wherein the first service performance result identifies whether the first payment request is successfully processed through the target system.

5. The computer-implemented method of claim 1, wherein the first payment request includes a payment amount of a first currency used by the source system different from a second currency used by the target system, and the method further comprises:

converting the payment amount of the first currency to a payment account of the second currency based on a currency exchange rate; and sending the payment amount of the second currency to the target system for requesting payment from the target system.

6. The computer-implemented method of claim 5, further comprising:

receiving a payment of the payment amount of the second currency from the target system;

saving the payment from the target system to a temporary account;

converting the payment of the payment amount of the second currency to a payment of a payment amount of the first currency; and transfer the payment of the payment amount of the first currency to the source system.

7. A non-transitory, computer-readable medium storing one or more instructions executable by a computer system to perform operations comprising:

receiving, by a service platform, a first service request from a source system for performing a first service from a user's account of a target system, wherein the first service request from the source system comprises a first payment request and includes information that identifies a user's account of the source system and information of the target system that is bound to the user's account of the source system, wherein a user is associated with both the user's account of the source system and the user's account of the target system;

sending, by the service platform, the first service request to the target system for loading a user account login interface for logging in to the user's account of the target system through the source system;

after sending the first service request to the target system, receiving, by the service platform, a first service performance result from the target system after performing the first service from the user's account of the target system, wherein the first service performance result comprises login information of the user's account of the target system, and wherein the login information of the user's account of the target system is verified by the target system using account and password information of the user's account of the target system that are input through the user account login interface by the user associated with both the user's account of the source system and the user's account of the target system;

after receiving the first service performance result from the target system, storing, by the service platform and in a computer-readable predetermined storage unit of the service platform, a mapping relationship between the user's account of the source system and the user's account of the target system;

receiving, by the service platform, a second service request from the source system for performing a second service from the user's account of the target system, wherein the second service request from the source system comprises a second payment request and includes the information that identifies the user's account of the source system and the information of the target system;

identifying, by the service platform, the user's account of the target system based on the second service request and the mapping relationship between the user's account of the source system and the user's account of the target system;

sending, by the service platform, the second service request and the user's account of the target system to the target system; and performing, by the service platform, an operation of logging in to the user's account of the target system using the login information of the user's account of the target system, without requiring input of login related information from the user.

8. The non-transitory, computer-readable medium of claim 7, wherein the service platform coordinates the source system and the target system.

9. The non-transitory, computer-readable medium of claim 7, wherein the target system is identified based on a payment method selected by the user.

10. The non-transitory, computer-readable medium of claim 7, wherein the first service performance result identifies whether the first payment request is successfully processed through the target system.

11. The non-transitory, computer-readable medium of claim 7 wherein the first payment request includes a payment amount of a first currency used by the source system different from a second currency used by the target system, and wherein the operations further comprise:

converting the payment amount of the first currency to a payment account of the second currency based on a currency exchange rate; and sending the payment amount of the second currency to the target system for requesting payment from the target system.

12. The non-transitory, computer-readable medium of claim 11, further comprising:
   receiving a payment of the payment amount of the second currency from the target system;
   saving the payment from the target system to a temporary account;
   converting the payment of the payment amount of the second currency to a payment of a payment amount of the first currency; and
   transfer the payment of the payment amount of the first currency to the source system.

13. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      receiving, by a service platform, a first service request from a source system for performing a first service from a user's account of a target system, wherein the first service request from the source system comprises a first payment request and includes information that identifies a user's account of the source system and information of the target system that is bound to the user's account of the source system, wherein a user is associated with both the user's account of the source system and the user's account of the target system;
      sending, by the service platform, the first service request to the target system for loading a user account login interface for logging in to the user's account of the target system through the source system;
      after sending the first service request to the target system, receiving, by the service platform, a first service performance result from the target system after performing the first service from the user's account of the target system, wherein the first service performance result comprises login information of the user's account of the target system, and wherein the login information of the user's account of the target system is verified by the target system using account and password information of the user's account of the target system that are input through the user account login interface by the user associated with both the user's account of the source system and the user's account of the target system;
      after receiving the first service performance result from the target system, storing, by the service platform and in a computer-readable predetermined storage unit of the service platform, a mapping relationship between the user's account of the source system and the user's account of the target system;
      receiving, by the service platform, a second service request from the source system for performing a second service from the user's account of the target system, wherein the second service request from the source system comprises a second payment request and includes the information that identifies the user's account of the source system and the information of the target system;
      identifying, by the service platform, the user's account of the target system based on the second service request and mapping relationship between the user's account of the source system and the user's account of the target system;
      sending, by the service platform, the second service request and the user's account of the target system to the target system; and
      performing, by the service platform, an operation of logging in to the user's account of the target system using the login information of the user's account of the target system, without requiring input of login related information from the user.

14. The computer-implemented system of claim 13, wherein the service platform coordinates the source system and the target system.

15. The computer-implemented system of claim 13, wherein and the target system is identified based on a payment method selected by the user, and wherein the first service performance result identifies whether the first payment request is successfully processed through the target system.

16. The computer-implemented system of claim 13, wherein the first payment request includes a payment amount of a first currency used by the source system different from a second currency used by the target system, and wherein the one or more operations further comprise:
   converting the payment amount of the first currency to a payment account of the second currency based on a currency exchange rate; and
   sending the payment amount of the second currency to the target system for requesting payment from the target system.

17. The computer-implemented system of claim 16, further comprising:
   receiving a payment of the payment amount of the second currency from the target system;
   saving the payment from the target system to a temporary account;
   converting the payment of the payment amount of the second currency to a payment of a payment amount of the first currency; and
   transfer the payment of the payment amount of the first currency to the source system.

* * * * *

UNITED STATES PATENT AND TRADEMARK OFFICE
CERTIFICATE OF CORRECTION

PATENT NO. : 11,200,566 B2
APPLICATION NO. : 16/009310
DATED : December 14, 2021
INVENTOR(S) : Huan Wang Page 1 of 1

It is certified that error appears in the above-identified patent and that said Letters Patent is hereby corrected as shown below:

In the Claims

Column 20, Line 58, in Claim 11, delete "claim 7" and insert -- claim 7, --.

Column 22, Line 11, in Claim 13, delete "and" and insert -- and the --.

Column 22, Line 27, in Claim 15, delete "and the" and insert -- the --.

Signed and Sealed this
Twelfth Day of April, 2022

Drew Hirshfeld
*Performing the Functions and Duties of the
Under Secretary of Commerce for Intellectual Property and
Director of the United States Patent and Trademark Office*